CALL RECOGNITION SYSTEM

Filed Sept. 2, 1958 3 Sheets-Sheet 1

INVENTOR.
GEORGE F. GRONDIN
BY Moody and Goldman
ATTORNEYS

INVENTOR.
GEORGE F. GRONDIN
BY Moody and Goldman
ATTORNEYS

Feb. 28, 1961 G. F. GRONDIN 2,973,507

CALL RECOGNITION SYSTEM

Filed Sept. 2, 1958 3 Sheets-Sheet 3

INVENTOR.
GEORGE F. GRONDIN
BY Moodyand Goldman
ATTORNEYS

United States Patent Office 2,973,507
Patented Feb. 28, 1961

2,973,507

CALL RECOGNITION SYSTEM

George F. Grondin, Van Nuys, Calif., assignor to Collins Radio Company, Cedar Rapids, Iowa, a corporation of Iowa Filed Sept. 2, 1958, Ser. No. 758,411

10 Claims. (Cl. 340—155)

Figure 1:
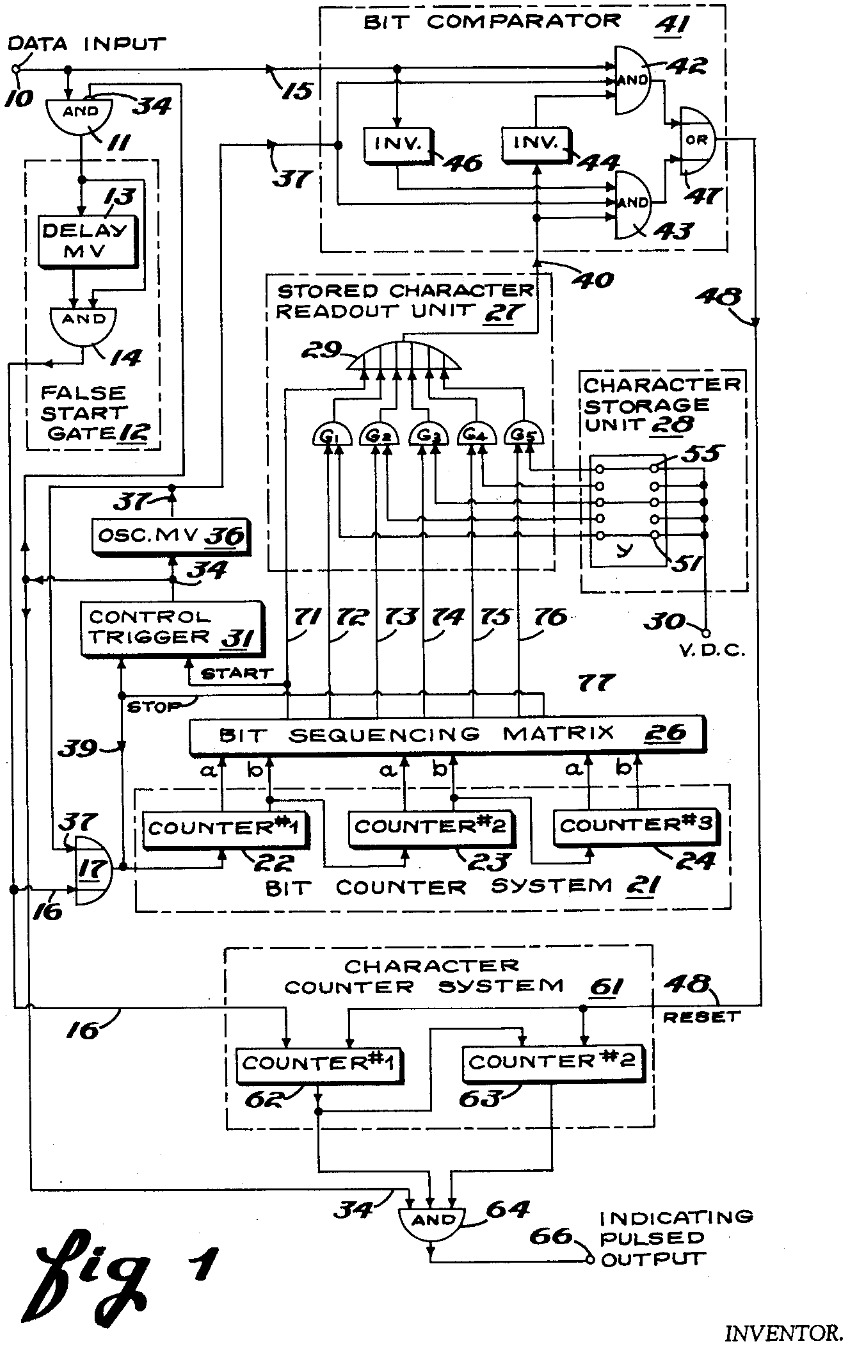

This invention relates generally to selective-calling means using pulse-code-modulation techniques for selectively contacting a particular one among many receivers connected to the same line.

An analogous radio arrangement similar to connection of plural receivers to a single line is where plural radio receivers and transmitters are all operated on the same frequency. Selective-calling techniques can be similarly used in this situation to identify a particular receiver.

With selective-calling systems, a message can be directed to a selected receiver without disturbing other receivers. Many types of selective-calling systems are known. Perhaps the most familiar is the party line found commonly in telephone systems, where a group of receivers are always connected to the same line. The telephone system generally uses different ringing frequencies to distinguish among different receivers on a party line. That is, each receiver has a bell which responds only to a preset ringing frequency.

It is mentioned that telephone-dialing techniques are not per se analogous to selective-calling means. Such dialing techniques provide a wire-connecting process at a centralized location that switches wire lines to connect a previously disconnected receiver (or group of party-line receivers) to a calling transmitter. On the other hand, selective-calling means does not switch lines at a centralized location but merely provides an identifying signal to a particular one of a number of receivers joined by the same line. The signal can be used at the receiver locations to prevent non-intended recipients from receiving the message.

The present invention is concerned with pulse-code-modulation, such as is used in teletypewriter circuits. Systems using such modulation generally have narrow bandpasses, and it becomes difficult to have more than a few ringing frequencies, which limits the selective-calling feature and furthermore requires additional tone-calling equipment at each transmitter. Thus, where a large number of teletypewriters are on the same line, some other technique must be used. Prior methods of using pulse-code-modulation for selective-calling involved complex mechanical arrangements incorporated into a teletypewriter machine, which required the machine to be running in order for it to be able to recognize a selective call. Consequently, substantial wear and power consumption occurred during long periods of waiting when no message was being received.

When used with a teletypewriter, the present invention is operated independently of the teletypewriter machine and has no mechanically moving parts. The invention can be used to turn on a teletypewriter whenever it is called.

It is therefore an object of the invention to provide a selective-calling system for pulse-code-modulation-communication systems.

It is another object of this invention to provide a selective-calling system for teletypewriters to operate while a teletypewriter is turned off.

It is a further object of this invention to provide a selective-calling system which does not require any mechanically-moving parts.

It is still another object of this invention to provide a pulse-coded selective-calling system which can be entirely transistorized to require very little operating power.

It is another object of this invention to provide a selective-calling system using a calling code that may be either a single code-character repeated a predetermined number of times, or any predesignated sequence of different code-characters.

A feature of this invention is a bit comparator that receives incoming code-characters and receives a synchronous readout of one or more stored characters, and compares them on a bit-by-bit basis.

The bit comparator of this invention thus has one input receiving the incoming data and has another input receiving a stored character in bit synchronism with the incoming character. The comparator includes a pair of "and" circuits, a pair of "not" circuits (inverters), and an "or" circuit. The first "and" circuit has an input that directly receives the incoming data and has another input receiving the stored data through an inverter, which is a "not" or "complementing" circuit in logic terminology. The second "and" circuit has one input which directly receives the stored data and has another input that receives the stored data through a second "not" circuit. The "or" circuit isolatingly couples the outputs of the respective "and" circuits to provide the comparator output. The comparator recognizes dissimilarity between an incoming data character and a stored character by providing an output reset pulse for each pair of dissimilar bits.

A character-quantity counter system continuously counts the number of incoming characters but is reset to zero by each reset pulse from the bit comparator. By assigning a calling code which cannot be accidentally obtained in the normal course of data transmission, the bit comparator resets this counter after every one or two received characters. Thus, the character-quantity counter system can reach a particular count, such as three, only when receiving the assigned calling code. When the particular count is reached, the counter provides a signal indicating that a call is to be received.

An assigned character is stored by a plurality of contacts or terminals that are connected to different voltage levels in a sequence corresponding to the mark-and-space bits of an assigned character (or characters). A synchronous readout of the stored character is obtained by having the "start" pulse of each incoming code-character gate-on an oscillator that generates pulses having a repetition rate very nearly equal to the bit rate of the incoming data. The oscillator is shut off during the stop pulse of the same character by a bit counter. Thus, the oscillator provides pulses which are synchronous with the bits of the received data. These pulses sequentially enable readout gates that connect the preset terminals in bit synchronism with each incoming character to provide the stored character to the bit comparator.

Figure 2:
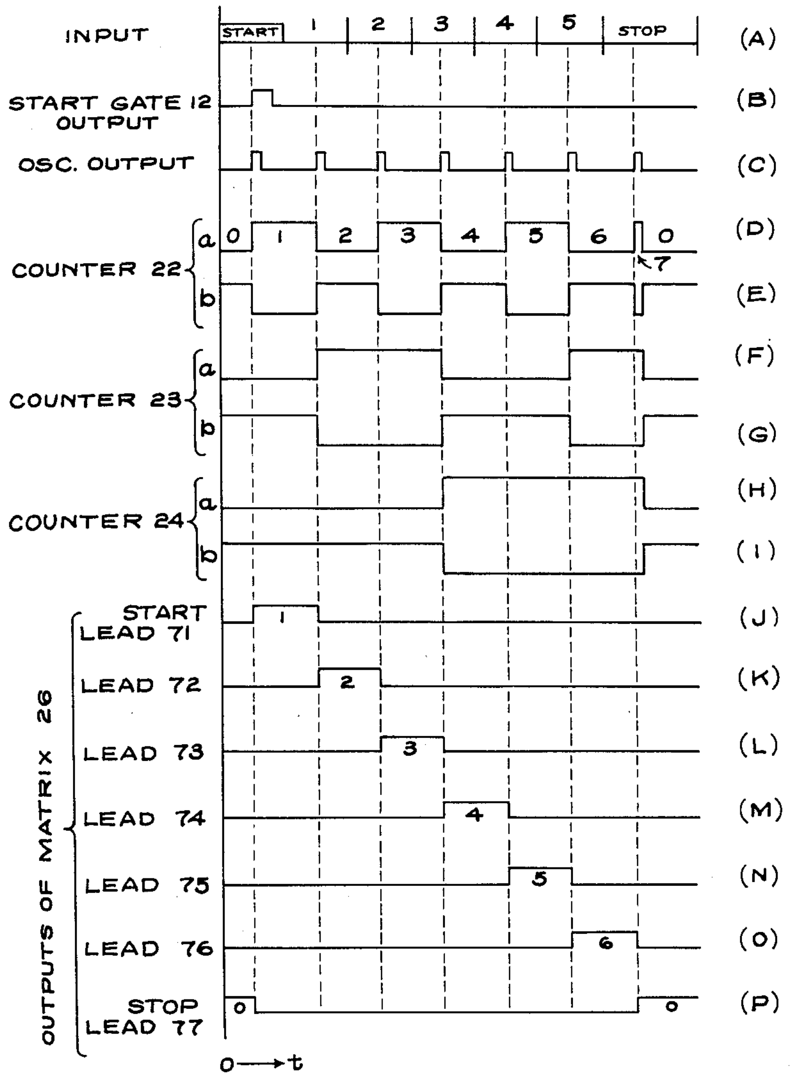
Figure 3:
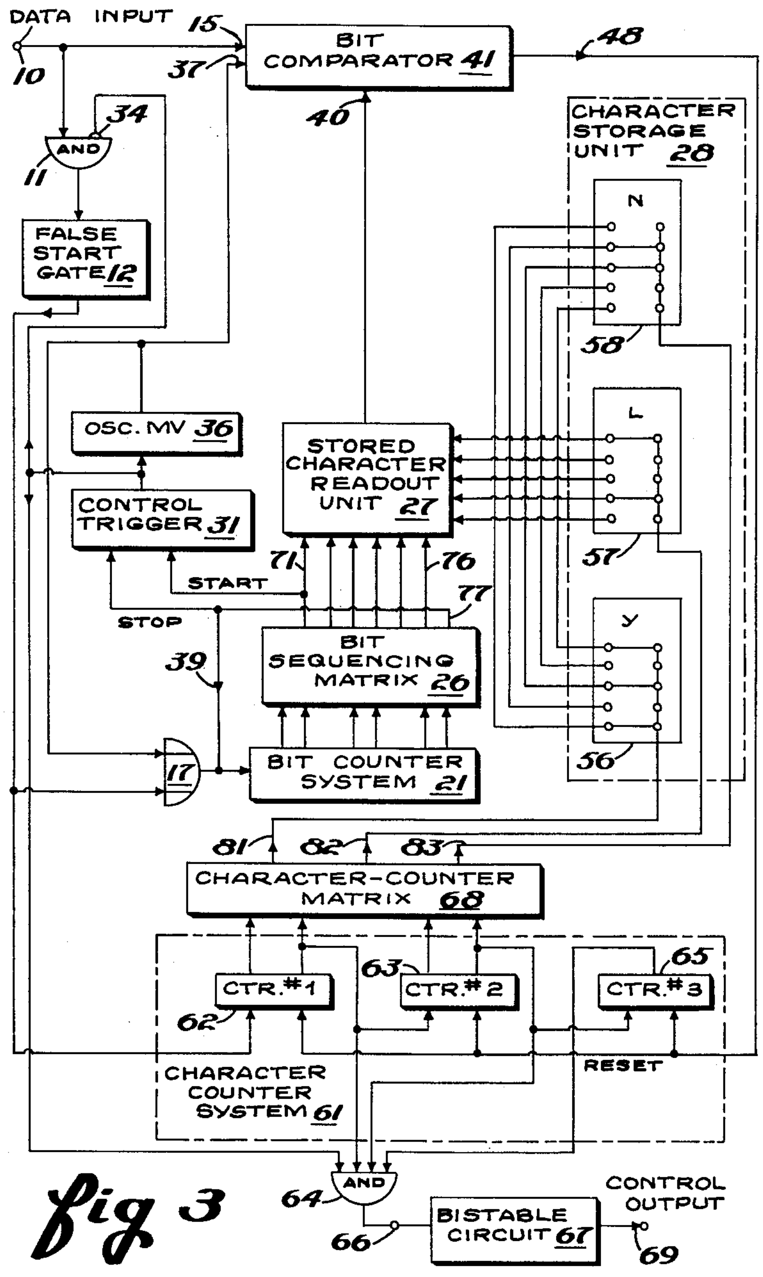

Further objects, features and advantages of this invention will be apparent to one skilled in the art upon further study of the specification and the accompanying drawings, in which:

Figure 1 illustrates one form of the invention;

Figures 2(A) through (P) illustrate waveforms used in explaining the invention; and Figure 3 illustrates an expanded form of the invention.

The drawings are now referred to for an explanation of detailed embodiments of the invention. The system in Figure 1 recognizes a code consisting of three consecutive repetitions of a single code-character. For example, a particular station may be assigned a calling desgination of TTT or YYY, as examples. Such a code takes advantage of a characteristic of the English language, wherein a particular letter seldom, if ever, occurs three times consecutively.

Since there are 32 different characters in the conventional seven-bit teletypewriter code, including start and stop bits, such a calling code can select among a maximum of 32 different stations connected to the same communication circuit.

The invention can easily be modified, as is later discussed in connection with Figure 3, to use different code characters in any assigned sequence as a calling code.

Such call letters are simply transmitted by typing the letter Y three times in a row.

In Figure 1, a terminal 10 receives seven-bit teletypewriter data. In this exemplary embodiment, the assigned call letters YYY are assumed. Whenever such a calling code is received, an indicating pulse is provided to a terminal 66. Such a pulse can be used in many well-known ways, such as to enable the printing apparatus at the called station. A second transmission of the code can be sent to identify the end of a message.

A bit comparator 41 has an input 15 connected to a terminal 10 to receive the incoming data. Another input 40 of bit comparator 41 simultaneously and synchronously receives the stored character used in the assigned code.

The start pulses of the incoming characters are used to synchronize the stored characters. Only the start pulses are permitted to pass through a gate 11 having an input connected to terminal 10. Input gate 11 also has an inhibiting input 34 which disables the gate during the remaining portion of each character. Input 34 is connected to the output of a control-trigger circuit 31, which provides an output during the period of the information bauds of each character. This output disables "and" gate 11. The operation of trigger circuit 11 is treated in detail later. Thus, pulsing by information bits following a start pulse cannot interfere with the synchronizing operation of the system. However, gate 11 is again enabled after the termination of a character, until the next "start" pulse is received.

Gate 11 is enabled between input characters. It can then pass noise pulses. In order to make the system more immune to the effects of noise pulses and to properly phase the storage timing, a false-start gate 12 is provided, which has its input connected to the output of gate 11. Gate 12 includes a delay multivibrator 13 which provides a short duration pulse approximately one-half baud after the beginning of a start pulse. A gate 14 has one input directly receiving the undelayed start pulse and has another input receiving the delayed pulse from multivibrator 13. Gate 12 does not provide an output until both inputs to gate 14 are actuated, which occurs approximately during the mid-period of the start baud. Thus, output pulses from an output 16 of start gate 12 are phased with the mid-portion of the received start pulse.

Accordingly, a single output pulse, hereafter called a "synchronizing pulse," is provided from gate 12 per incoming code character. Two counter systems 21 and 61 receive these synchronizing pulses. Counter system 61 counts them and will be discussed in greater detail below.

Bit counter system 21 controls the sequencing and total number of bits in the readout of each stored character Y to bit-comparator input 40. Counter system 21 is triggered by synchronizing pulses received through an "or" gate 17. System 21 comprises three binary counters 22, 23 and 24, each providing a pair of opposite output states *a* and *b*. A bit-sequencing matrix 26 receives the respective outputs of counters 22–24. Matrix 26 is a conventional type which translates the sequential input pulses to the counter system into parallel outputs. Seven output leads 71–77 are provided from matrix 26, which correspond to the seven bauds per character used by the system. Thus, lead 71 provides a pulse corresponding to a start baud; leads 72–76 respectively provide pulses corresponding in time to the five information bauds; and lead 77 provides a pulse corresponding to the stop baud of a character.

Figure 2(A) illustrates the bit timing of a received character, consisting of start and stop bauds enclosing five information bauds. Figure 2(B) illustrates the corresponding output from false-start gate 12 in response to the start pulse of a code character. The respective binary counters in counting system 21 have the various output states given in Figures 2(D)–(I) over a period of each character. The initial state 0 of the counter system is shown by the initial levels of Figures 2(D)–(I). Upon receipt of a start pulse, counter 22 is triggered to state 1 given in Figures 2(D) and (E). The matrix then provides a start pulse on its lead 71, as shown in Figure 2(J). The pulse on lead 71 is provided to a start input of a control-trigger circuit 31, which then triggers on an oscillating multivibrator 36 that is normally off. When triggered on, multivibrator 36 provides a sequence of pulses which have a repitition rate equal to the input character baud rate, which would be 45 pulses-per-second for a 60 word-per-minute rate. Immediately upon being triggered on, multivibrator 36 provides an ineffective first pulse to counter 22 through an input 38 of "or" circuit 17; this first oscillator pulse does not effect the counter state because it occurs while the synchronizing pulse from gate 12 is still in existence. Pulsing oscillator 36 thereafter continues to provide seven short duty-cycle pulses at the bit rate. The second oscillator pulse, however, triggers counter 22 to output state 2. This triggers counter 23 as shown in Figure 2(G); consequently, matrix 26 provides a pulse on its next lead 72 time-coincident with the center portion of the first information baud of the incoming code-character. Figure 2(K) illustrates the voltage output from matrix lead 72.

Thus, oscillating multivibrator 36 continues to oscillate for seven pulses that are synchronous with the incoming data providing the outputs on leads 71–77 shown in Figures 2(J)–(P). The seventh pulse on lead 77 is received by the stop input of trigger circuit 31 to shut off oscillating multivibrator 36 and stop further input pulses to counter 21, until the next input character. Also, the same pulse on lead 77 passes through lead 39 to trigger counter system 21 back to zero state.

A stored-character readout unit 27 receives the outputs of matrix 26 and provides a synchronous readout of the stored character. It includes readout gates $G_1$ through $G_5$, each having an input connected to a respective matrix output lead 72–76. Gates $G_1$–$G_5$ are sequentially enabled by matrix 26 in synchronism with the information bauds of the incoming character. This is seen by comparing the timing of Figure 2(A) with Figures 2(K)–(O). As gates $G_1$–$G_5$ are sequentially enabled, they respectively provide an output pulse (or no output pulse) through an "or" gate 29, as determined by an enabling (or disabling) voltage on the other input of each gate $G_1$–$G_5$. This other voltage is determined by a character storage unit 28 that has five pairs of terminals 51–55. One terminal of each pair is thus connected to a respective input of each gate $G_1$–$G_5$. The other terminal of each pair is connected in common to a direct-current voltage source 30. Hence, any particular pair of terminals 51–55 may be either closed or open circuited by providing a jumper (or no jumper) between its terminals to correspond to a mark or a space stored bit. In this example, the provision of a current by a jumper corresponds to a mark, and no current (open terminals) corresponds to a space. Jumpers (or no jumpers) hence are provided according to the pulse code representing the assigned call letter, which in this example is Y. Accordingly, jumpers are provided between the pairs of terminals 51, 53 and 55, where pair 51 is considered first in the sequence.

It therefore becomes apparent how different current levels could also be provided, such as using two different values of resistors as jumpers, or by using two voltage sources for marks and spaces, respectively, and eliminating the terminal pairs.

Thus, after each synchronizing pulse is received from start gate 12, readout unit 27 ejects a code-character Y from the output of its "or" circuit 29 that is bit synchronous with an incoming code-character at input terminal 10.

Bit comparator 41 receives at input 40 the bits of stored code-character Y; and comparator 41 receives the incoming data at input 15, which is connected to input terminal 10. Whenever an incoming data bit does not correspond to the synchronized stored bit, comparator 41 ejects a pulse at its output 48 to indicate nonsimilarity between the incoming and stored characters.

Thus, comparator 41 does not provide any output pulse, if its inputs 15 and 40 are simultaneously both marks or both spaces. However, if a mark is received at one input and a space is received at the other, an output pulse is provided. Consequently, with all received code characters, except for the one representing Y, at least one bit is different from the bits of "Y" to cause an output pulse from comparator 41.

Bit comparator 41 comprises a pair of "and" circuits 42 and 43 of the same type, each having three inputs. One input of "and" circuit 42 is connected to comparator input 15 to directly receive each incoming character; and a second input of circuit 42 is connected through an inverter 44 to the other comparator input 40 to synchronously receive inverted stored bits of character Y. In a reversed manner, one input of "and" circuit 43 is connected to comparator input 40 to receive synchronously the stored bits of character Y; and circuit 43 has a second input which is connected through another inverter 46 to receive inverted input bits. A third input of each "and" circuit 42 and 43 is connected to terminal 37 to receive the output pulses of oscillator multivibrator 36. When delay multivibrator 13 is set to obtain a one-half baud delay, the pulses from oscillator 36 will occur during the mid-periods of the incoming bits.

"And" circuits 42 and 43 are each conventional logic circuits. Such circuits work with pulses of a given polarity. For example, such a circuit may be designed to work with negative pulses or positive pulses. Or stated in another way, such circuits may be designed to operate with pulses which correspond to marks or to spaces of a teletypewriter code. In this particular case, it does not matter whether "and" circuits 42 and 43 are "mark" or "space" "and" circuits, as long as both circuits 42 and 43 are of the same type. Then, no output will be provided from comparator 41 as long as the same type of pulse is simultaneously provided at inputs 15 and 40, regardless of whether they are both marks or both spaces. However, if the inputs simultaneously receive different types of bits, an output pulse is provided from one or the other of "and" circuits 42 or 43 through "or" circuit 47 to output 48.

Second counter system 61 is provided to count the number of consecutively received characters corresponding to a predesignated calling code. Character counter system 61 is comprised of two bistable circuits 62 and 63, which may be conventional flip-flop circuits connected in tandem to the output of start gate 12.

Each counter 62 and 63 also has a reset input connected to output 48 of bit comparator 41. Counters 62 and 63 are reset to zero state whenever a pulse is received from the bit comparator.

Consequently, counter system 61 continually counts the number of received data characters until a reset pulse is received from comparator 44, wherein the counter starts over again from zero. In the normal course of events, three letters Y will never be received consecutively at the data input. That is, no more than two Y's will ever normally be received, with the exception of the selective-calling code. Consequently, bit comparator 41 will provide a reset output pulse at least once during every two received data characters during its normal course of operation. Hence, counter system 61 is normally never allowed to count up to three, except when receiving the proper selective-calling code.

An "and" circuit 64 is used to indicate when a count of three consecutive call letters is reached. It has an output connected to terminal 66 and has three inputs. One of its inputs 34 is connected to the output of control-trigger circuit 31; and its other two inputs are connected to the respective outputs of binary counters 62 and 63. Trigger circuit 31 provides a noninhibiting voltage to input 34 during the information period (between start and stop bauds) of each received character. The other two inputs simultaneously receive noninhibiting voltages only at the count of three by counter system 61. Accordingly, "and" gate 64 provides an output pulse to terminal 66 only upon the count of three, which is caused by the receipt of three consecutive code characters Y; and the output pulse has a duration equal to approximately five bits since that is the period of enablement at input 34. Hence, if more than three consecutive letters Y are received at data input 10, an indicating pulse will be provided at terminal 66 at every third consecutive letter Y. In other words, if a long sequence of letters Y are set, a sequence of output pulses will be provided corresponding to the third, sixth, ninth, etc. consecutively received letters Y.

Furthermore, the system of Figure 1 can easily be made to provide an indicating pulse after any number of consecutive repetitions of the predesignated code character. This can be done in more than one way. One involves connecting another counter (not shown) to terminal 66 to provide an indication after a particular multiple of three consecutive letters Y are received. Another way is to increase the count of counter system 61 to any desired number, and to provide "and" gate 64 with a correspondingly greater number of inputs.

The output pulse at terminal 66 can be used to control the operation of a teletypewriter machine, or otherwise give an indication in response to the calling code. One type of control operation will be discussed later in connection with the output in Figure 3.

In some situations it may be required to use a calling code having more than one code-character. The system of Figure 3 teaches how any particular combination of characters may be used as a selective-calling code. The particular embodiment of Figure 3 uses the chosen selective-calling code KYLNZ, which includes a basic three character code of YLN bounded by the prefix K and suffix Z that have particular purposes explained later.

The system of Figure 3 is basically the same as the system of Figure 1 with a few additions which are treated below. Thus, gate 11, false-start gate 12, "or" gate 17, counter system 21, counter matrix 26, readout gates 27, control-trigger circuit 31, oscillating multivibrator 36, and bit comparator 41, can be identical to the same numbered elements in Figure 1.

In Figure 3, character-counter system 61 has a third counter 65 in order to be able to count from zero to four; and gate 64 has an additional input connected to the output of counter 65.

However in Figure 3, a character-counter matrix 68 is added and is of the same type as matrix 26, except that matrix 68 has three outputs 81, 82 and 83, since it works with a smaller counter system than matrix 26. The three output leads 81, 82 and 83 respectively provide pulses representing the counts one, two and three provided by system 61 following a resetting by an output pulse from bit comparator 41.

The basic code characters YLN are stored respectively by terminal elements 56, 57 and 58 within character storage device 28 in Figure 3. The reasons for the prefix K and the suffix Z are explained below. Each element 56, 57 and 58 is the same as the single element of unit 28 in Figure 1. Thus, each of elements 56, 57 and 58 has one terminal from each of its five pairs connected to a respective input of each gate $G_1$–$G_5$ in the same manner as given for the terminals of the element of unit 28 in Figure 1.

Storage devices 56, 57 and 58 are enabled in that order by the respective outputs of matrix 68. Hence, each of the storage elements 56, 57 and 58 have the other terminal of each respective pair connected in common to a different one of the three matrix leads 81, 82 and 83. Thus, storage devices 56–58 sequentially receive enabling voltages from matrix 68 in response to three consecutive counts by counter 61. Every time a reset pulse is provided from comparator 41, counter 61 is reset to zero. Four consecutive counts can also occur when the basic predesignated code YLN is received. In the normal course of data transmission, such a letter combination would never be transmitted except as a calling code.

Consequently, a reset pulse will be provided from bit comparator 41 to counter 61 before a count of three is ever reached by counter system 61 during ordinary data reception. The start pulse of any incoming character can trigger counter system 61 to the count of one, which energizes only lead 81 and storage device 56 to cause the character Y to be injected at comparator input 40, in the same manner as explained with Figure 1. If the incoming character is not a Y, a reset pulse is provided; and upon reception of the next input character, system 61 of Figure 3 is again set to count one and again the character Y is read out of storage.

However, if an incoming character is a Y, no reset pulse is provided; and the next incoming character triggers system 61 to two, which energizes matrix lead 82 and element 57, so that letter L is read out of storage to comparator input 40. If the simultaneous incoming character is not an L, a reset pulse is provided that resets counter system 61 to zero and starts the procedure over again on the next data character. However, if the second data character was an L, no reset pulse occurs, and the following data character triggers counter system 61 to three, which energizes matrix output 83 and storage element 58, thus reading out stored-letter N to comparator input 40. If the next data character is not an N, the system resets back to its initial state as explained above. However, if the call letters are being received, the incoming character N prevents counter system 61 from being reset, and the start pulse of the next incoming character causes system 61 to register the count of four, which triggers counter 65 and enables "and" gate 64 to provide an output indicating pulse.

The reasons for the prefix K and suffix Z are now given. If the calling code YLN is received, it can only be recognized if counter 61 is reset to zero immediately before its reception. Since it cannot be assured that counter 61 will be at zero state upon the reception of the calling code, YLN, it is desirable to add a prefix letter that is different from these assigned letters. Hence, any letter not in the code may be used as a prefix, and K is arbitrary.

The suffix letter assures that a fifth synchronization pulse is provided to enable the last required count for system 61, which is necessary to actuate "and" gate 64. The suffix can be any character, including those in the assigned code, since only the start pulse of that character is needed. Hence, Z is arbitrary as a suffix.

On the other hand, the single-letter code of Figure 1 did not require any prior preset to zero, because if counter 61 is at a count other than zero, the code sequence merely causes an output pulse before its last repeated letter is reached.

The calling code can be used to control the off-on-off operation of a teletypewriter, for example. This can be done by sending the code at the beginning of a message to turn-on the intended receiving machine and by sending the code again at the end of the message to turn-off the machine. Thus, only the intended machine gets the message, and it does not run idly between messages. This type of control is provided by the system of Figure 3 by connecting a bistable circuit 67 to terminal 66. Hence, bistable circuit 67 is triggered to its "on" state by the first reception of the calling code at the beginning of a message and is triggered to its "off" state by the second reception of the calling code at the end of a message. Control output 69 of the bistable circuit hence can operate a power relay (not shown) that switches electrical power on and off to a teletypewriter machine.

Although this invention has been described with respect to particular embodiments thereof, it is not to be so limited as changes and modifications may be made therein which are within the full intended scope of the invention as defined by the appended claims.

I claim:

1. A pulse-code-modulation selective-calling recognition circuit, comprising bit-comparing means for providing an output pulse when dissimilar character bits are received at a pair of inputs, means for providing received pulse-code characters to one of said inputs, means for providing storage pulse-code characters to the other input in bit synchronism with said received characters, means for counting received characters, reset means provided with said counting system for being reset by output pulses of said bit comparator, and means for indicating a particular count reached by said counter system to indicate the reception of an assigned selective-calling code.

2. A system as defined in claim 1 in which said bit comparing means comprises a first and second "and" circuits, one input of the first "and" circuit providing one input of said comparator, an inverter connected between said one input of said first "and" circuit and one input of said second "and" circuit, another input of the second "and" circuit providing the other input of said comparator, a second inverter connected between said another input of said second "and" circuit and another input of said first "and" circuit, and means connecting the outputs of said "and" circuits to provide the output of said comparator.

3. A comparator for determining the similarity of binary data received at a pair of inputs on a bit synchronous basis comprising, first and second "and" circuits, a first input of said first "and" circuit providing one comparator input, a first inverter connected between the first input of said first "and" circuit and a first input of said second "and" circuit a second input of said second "and" circuit providing the other comparator input, a second inverter connected between the second input of said second "and" circuit and a second input of said first "and" circuit, an "or" circuit having a pair of inputs respectively connected to outputs of said "and" circuit, an output of said "or" circuit providing the output of said comparator.

4. A pulse-code-modulation selective-calling recognition circuit comprising input means for providing incoming mark-space code-characters to said circuit, a character-quantity counter system, means connecting the input of said quantity-counter system to said input data means to provide a pulse to said counter for each input data character, means for storing an assigned code-character, means for reading out said stored code-character connected to and being triggered by said connecting means in synchronism with the bits of any incoming code-character, bit-comparing means for providing a pulse at its output whenever a mark is received at one input and a space is simultaneously received at its other input, a reset input being connected to the output of said comparing means, means for connecting said readout means to said one input of said bit comparator, and means connecting said input means to the other input of said bit-comparing means.

5. A system as defined in claim 4 in which said readout means comprises, a pulsed oscillator, a bit counter system having its input connected to the output of said pulsed oscillator, a bit-sequencing matrix being connected with said bit counter system and having plural outputs equal in number to the bits in the stored character, start and stop outputs being included in said plural outputs of said matrix, a control-trigger circuit having opposite inputs connected to the start and stop outputs of said matrix, said pulsed oscillator being connected to and gated on and off by the output of said control-trigger circuit, a plurality of readout gates each having a pair of inputs and an output, with one input being connected respectively to one of the other outputs of said matrix, a storage unit including a plurality of terminals connected between the other inputs to said readout gates and a voltage source in a sequence corresponding to the stored character, means connecting outputs of said readout gates and the start output of said matrix to said other input of said bit-comparing means, and an "and" circuit having a plurality of inputs and an output, with one input connected to the output of said control-trigger circuit and its other inputs connected to output of said character-quantity counter system to be enabled upon a given count.

6. A selective-calling recognition circuit for pulse-code-modulation communication systems, comprising receiving means for incoming mark-space data code-characters, a first "and" gate having, one input connected to said receiving means, a first "or" gate, start-pulse means connecting one input of said first "or" gate to an output of said first "and" gate, a bit counter system connected to an output of said first "or" gate, a bit-sequencing matrix connected to said bit counter system, said matrix having a plurality of separate outputs actuated respectively during the start, information, and stop bits of each received character, a control-trigger circuit having a pair of inputs respectively connected to the start and stop outputs of said matrix, a pulsing oscillator connected to said control-trigger circuit and being gated on and off by the start and stop matrix outputs, a second input of said first "or" circuit being connected to an output of said pulsing oscillator, a second input of said first "and" gate being an inhibiting input and being connected to the output of said control-trigger circuit, a plurality of readout gates, said readout gates each having an input connected to a respectively different one of the information bit outputs of said bit-sequencing matrix, a voltage source being sequentially connected to other inputs of said readout gates in a coded sequence corresponding to an assigned code character, a bit-comparator with a first input being connected to said receiving means, a second "or" gate connecting the outputs of said readout gates and the start output of said matrix to the second input of said bit comparator; said bit comparator comprising a pair of "and" circuits of the same type, with one input of each being connected to the output of said pulsing oscillator, the first comparator input being connected to a second input of one of said pair of "and" circuits, a first inverter connected between a third input of said one "and" circuit and the second comparator input, a second input of said other of said pair of "and" circuits being connected to the second comparator input, and a second inverter connected between a third input of said other "and" circuit and the first comparator input, and a third "or" circuit having a pair of inputs respectively connected to outputs of said pair of "and" circuits, with an output of said third "or" circuit providing an output of said bit comparator; a character counter system having a counting input and a zero resetting input; with the resetting input connected to the output of said bit-comparator, and the counting input connected to a first input of said first "or" gate, and an output "and" gate having one input connected to the output of said control-trigger circuit, and other inputs of said output "and" gate being connected to said character counter system, with said output "and" gate providing an output indication upon reception of an assigned selective-calling code.

7. A selective-calling recognition circuit as defined by claim 6 in which said start-pulse means comprises a delay multivibrator providing a delay within the range of one-quarter to three-quarters of the duration of an input start bit, an "and" gate with one input connected to the input of said delay multivibrator, and means connecting another input of said "and" gate to the output of said delay multivibrator, an output of said "and" gate providing the output of said start-pulse means.

8. A selective-calling recognition circuit as defined by claim 6, having a plurality of character-storage elements, each element comprising plural pairs of terminals, each element having one terminal of each of its pairs respectively connected to the second inputs of said readout gates, and the other terminal of each pair in one of said elements being commonly connected, a character-counter matrix being connected with said character counter system, said character-counter matrix having a plurality of parallel outputs corresponding to respective counts of said character counter system, the outputs of said character-counter matrix being respectively connected to the commonly connected terminals of the respective storage elements.

9. A selective-calling recognition circuit for pulse-code-modulation communication systems, comprising means for receiving data characters having start, information, and stop bits, a first "and" circuit with one input connected to said receiving means, a false-start gate having an input connected to an output of said first "and" circuit, a first "or" gate with one input connected to an output of said false-start gate, a bit counter system with its input connected to the output of said first "or" gate, a bit-sequencing matrix connected to a plurality of outputs of said bit counter system, said bit-sequencing matrix having start and stop outputs and a plurality of intermediate outputs corresponding in number to the information bits per character, a control-trigger circuit having inputs connected to the start and stop outputs of said bit-sequencing matrix, means connecting another input of said first "and" circuit to an output of said control-trigger circuit to provide an inhibiting input for all information bits, a pulsing oscillator having a repetition rate approximately equal to the data bit rate, said oscillator being controllably connected to said trigger circuit, an output of said oscillator being connected to another input of said first "or" circuit, a plurality of readout gates with one input of each of said readout gates being respectively connected to said intermediate outputs of said bit-sequencing matrix, a plurality of storage elements, each comprising a plurality of terminals connected with either of two impedance relationships to an input of the element, the terminals in each element being respectively connected to the other inputs of said readout gates, the sequencing of the impedance relationships of the terminals in each element corresponding to an assigned code-character, a character-counter system having a counting input, a reset input, and a plurality of outputs, with said counting input being connected to the output of said false-start gate, a character-counter matrix being connected to the outputs of said character-counter system, said character-counter matrix having a plurality of outputs respectively connected in an assigned order to the inputs of said elements, an output "and" gate with one input being connected to the output of said control-trigger circuit, other inputs of said output "and" gate being connected to outputs of said character-counter system, a bit comparator with an output connected to the reset input of said character-counter system, a comparator first input being connected to said receiving means, a readout "or" gate connecting a comparator second input to outputs of said readout gates and the start output of said bit-sequencing matrix.

10. A selective-calling circuit as defined in claim 9 in which said bit-comparator comprises, first and second "and" gates with a first input of said first "and" gate being the comparator first input, a first input of said second "and" gate being said comparator second input, a second input of each of said first and second "and" gates being connected to the output of said pulsing oscillator, a first inverter connected between a third input of said first "and" gate and the comparator second input, a second inverter connecting a third input of said second "and" gate to the comparator first input, an "or" circuit having a pair of inputs respectively connected to outputs of said first and second "and" gates, and an output of said "or" gate providing the reset output of said comparator.

References Cited in the file of this patent

UNITED STATES PATENTS

| | | |
|---|---|---|
| 2,611,026 | Blanton | Sept. 16, 1952 |
| 2,668,870 | Ridler | Feb. 9, 1954 |
| 2,669,706 | Gray | Feb. 16, 1954 |